United States Patent

Rich

[11] Patent Number: 5,979,987
[45] Date of Patent: Nov. 9, 1999

[54] AUTOMOBILE ARMREST EXTENSION

[76] Inventor: Joseph Rich, 6220 NW. 76th Ct., Parkland, Fla. 33067

[21] Appl. No.: 09/062,621

[22] Filed: Apr. 20, 1998

[51] Int. Cl.$^6$ ................... A47C 7/54; B60N 2/46
[52] U.S. Cl. ................. 297/411.23; 297/188.18; 297/227; 297/DIG. 6; 5/411
[58] Field of Search ............. 5/411; 297/411.23, 297/227, 188.01, 188.14, 188.19, 188.18, 219.1, 228.13, 228.12, DIG. 6

[56] References Cited

U.S. PATENT DOCUMENTS

| 438,279 | 10/1890 | Rowlett | 297/411.23 X |
|---|---|---|---|
| 3,271,073 | 9/1966 | Van Buren, Jr. | 297/227 X |
| 3,506,988 | 4/1970 | Saddoris | 2/411 |
| 4,339,061 | 7/1982 | Dunn | 297/188.18 X |
| 4,726,083 | 2/1988 | Hoshall | 5/411 |
| 4,858,995 | 8/1989 | Young | 297/227 X |
| 5,018,790 | 5/1991 | Jay | 297/DIG. 6 X |
| 5,310,245 | 5/1994 | Lyszczasz | 297/DIG. 6 X |
| 5,332,288 | 7/1994 | Coates | 297/227 X |
| 5,505,412 | 4/1996 | Van Hamme | 297/188.18 X |
| 5,605,374 | 2/1997 | Perry | 297/411.23 X |
| 5,692,711 | 12/1997 | Tucker | 297/411.23 X |

OTHER PUBLICATIONS

McMillan Bedding Co., Mattress Magnets Instructions, Nov. 1982.

Primary Examiner—Peter M. Cuomo
Assistant Examiner—Rodney B. White
Attorney, Agent, or Firm—Stanley J. Yavner

[57] ABSTRACT

An automobile center armrest extension, connected to, and useful for extending the height of, the center console found at the midpoint of the front seats of some automobiles, which allows the right arm of the driver to rest more comfortably while driving. The center console of such automobiles is normally set close to the height of the seats, rather than to function as an armrest for the driver and passenger. This connection between the extension and the console cover is provided by either an adjustable clip, a Velcro fastener or straps.

1 Claim, 4 Drawing Sheets

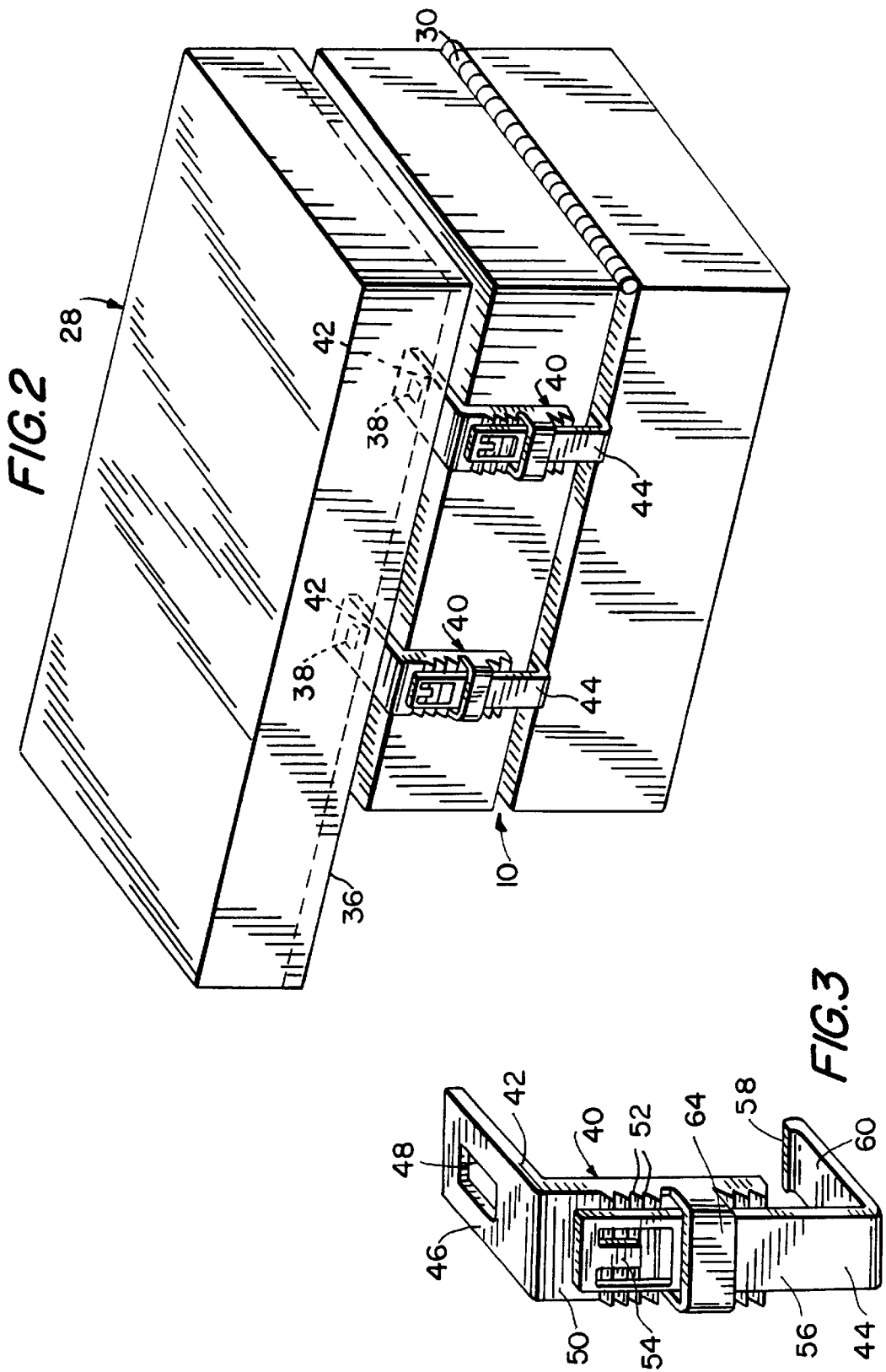

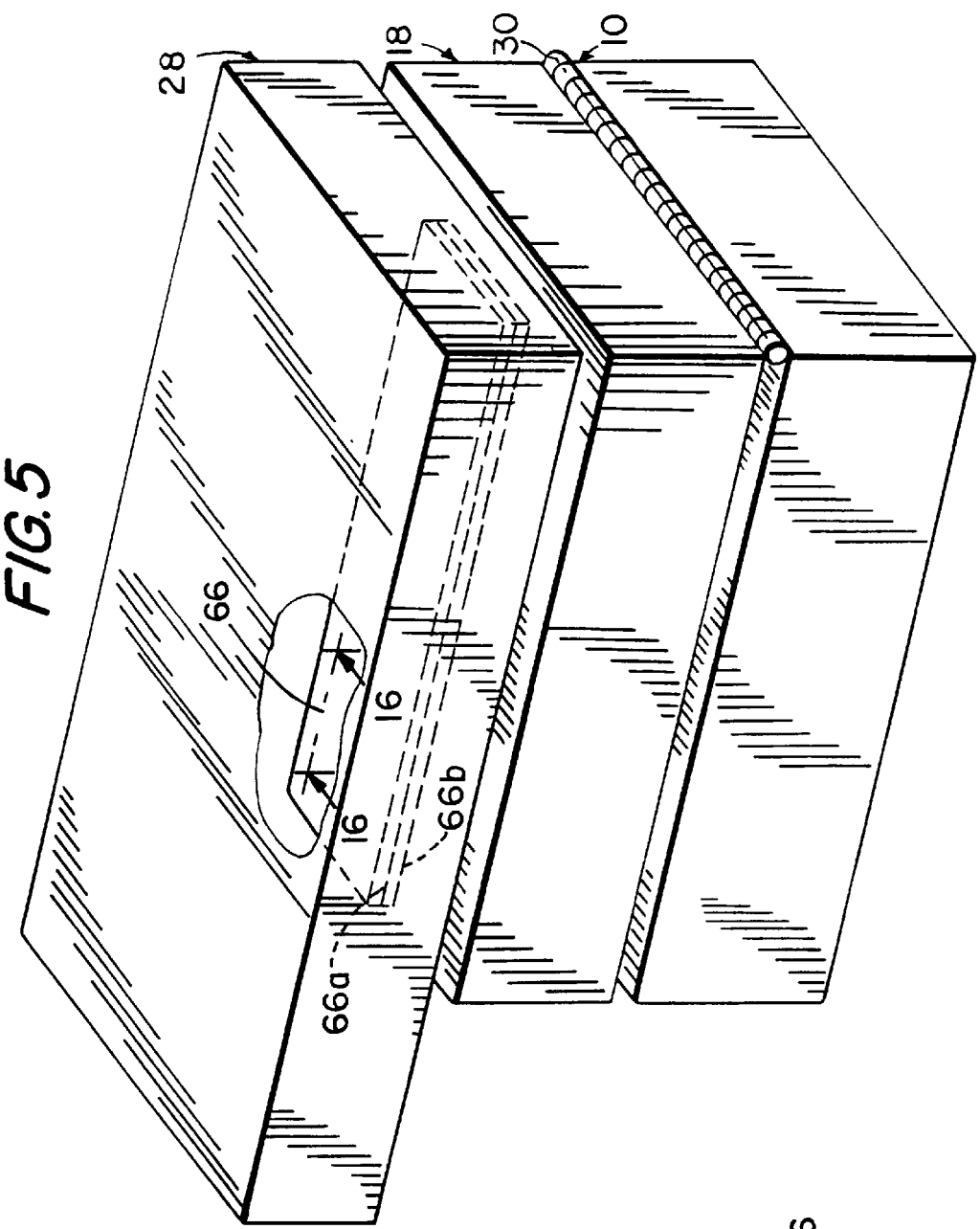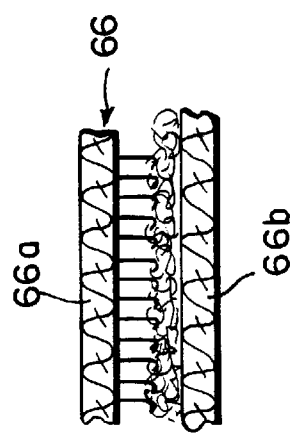

AUTOMOBILE ARMREST EXTENSION

FIELD OF THE INVENTION

This invention relates primarily to automobile armrests and more particularly for providing such armrests by upwardly extending the center consoles with top-hinged covers, as are commonly found in some makes and models of automobiles on the market.

BACKGROUND OF THE INVENTION

Commonly, some makes and models of automobiles are provided with split front seats, separated by a center console having a top, hinged console cover. It is also quite common, in such vehicles that the height of the center console cover is such as to be lower than a height that would provide a comfortable resting surface for the right forearm of the driver.

The prior art is not devoid of extending structures for providing a comfortable armrest for those who are either sitting in an automobile, as a passenger or a driver, or those who are simply sitting in a chair with chair arms that are too low to provide comfort. Examples of the prior art of the first type are exemplified by U.S. Pat. No. 5,332,288, inventor John H. Coates, who shows a portable cushioning accessory for automobile armrests affixed to the doors of an automobile; and an example of the latter type is U.S. Pat. No. 5,605,374, inventor Mary O. Perry. In the Perry patent, an adjustable padded armrest cushion is provided for removable attachment to the arm of a chair.

The Coates patent uses Velcro attachments, but is not of a structure to allow easy attachment, attractive attachment or convenient usage with respect to the center console cover, as described above, in an automobile. The particular design shown by Perry provides a severable bottom, at its center, to allow for convenient insertion to a sack. Such construction would actually provide features that would defeat the objectives of the present invention.

As to Coates, the disclosure is of an item particularly constructed to anchor an extension to the door-attached armrest in an automobile, but in a manner that is particularly suitable to that side armrest, as distinguished from a center console for the front of the vehicle. As an example, Coates discloses a means for attachment for the free ends 34 of the anchoring straps, to fasten such free ends to the side door panel of the vehicle.

SUMMARY AND OBJECTS OF THE INVENTION

Accordingly, a primary object of the present invention is to provide an upwardly extending structure, for attachment to a center console of the front seat area of an automobile, having a cover, to present a comfortable armrest for the driver thereof.

A further and more particular object is to provide such a structure with securement means in the form of, in a preferred embodiment, a locking strap so that the structure is immovable with respect to the cover of the center console, and yet adjustable.

A still further object of the present invention is to provide an attachment means for the extending structure, with respect to the cover of the center console, in an alternative embodiment, whereby the lower surface of the extending structure is fixed with respect to the upper surface of the center console cover.

These and other objects of the present invention are accomplished in a structure which features an upwardly extending armrest cushion in the form of a solid rectangular, plastic covered high-density foam, with means provided at the bottom thereof, and fixed to the cover of the center console from which it extends, for affixing the cushion to the cover of the center console. In the preferred embodiment, an adjustable clip construction is fastened by means of a brace portion fixed with respect to the cushion in an L-shape, with its long arm extending downwardly and defining ratchet means for adjustable mounting of a clip portion. The brace portion also includes a ring with a center opening, through which the clip portion is mounted to mesh, selectively, with the ratchet means. The clip portion is also generally L-shaped, with its short arm for fixing beneath the marginal portion of the underside of the cover of the center console. The clip portion is constructed of tensioned metal, whereby its selected position, with respect to the ratchet means, becomes fixed and secure upon placement. Of course, the springy construction of the clip portion is also such as to be released from the fixed position upon manual pressure at the bottom of the long arm of the L-shape of the clip portion.

In an alternative embodiment, the means provided at the bottom of the cushion is a mating strip, such as a Velcro strip, for mating with a complementary Velcro strip affixed to the center, top surface of the center console cover.

BRIEF DESCRIPTION OF THE DRAWINGS

Other objects, features and advantages of the present invention will become apparent by reference to the following detailed description of a preferred, but nonetheless illustrative, embodiment, and an alternative embodiment, with reference to the accompanying drawings, wherein:

FIG. 2 is a further isometric view of a preferred embodiment of the present invention, but with the extending cushion shown attached to a center console cover, in closed position;

FIG. 3 is an isometric view of the adjustable clip construction for fastening the extending cushion to the cover of the center console according to the preferred embodiment;

FIG. 5 is another isometric view of the alternative means for fixing the cushion to the cover of the center console, but with the center console and its cover in closed position; and FIG. 6 is a sectional view, blown up and schematic, taken along the line 6—6 of FIG. 5 and representing the Velcro-type projecting hooks and loops for the mating strips fastener in the alternative embodiment, for connecting the armrest extension cushion to the center console cover.

DETAILED DESCRIPTION OF THE PREFERRED AND ALTERNATIVE EMBODIMENTS

In many of today's automobile models, continuing from decades ago, the front seat construction is offered in a form which features a center-split, couch-form, bench seat, or a pair of bucket seats, both of which have at its center a console. The center console is normally for storage (what was stored, or still is stored in a "glove compartment"), or for holding part of the mechanism for a CD player, or for other usage. Normally, the center console is of solid rectangular form (as to the outside shape) and defines therewithin an opening of solid rectangular shape. Also, normally, the cover of the center console is hinged thereto, either at the long side of the margin of the opening, or more typically, at the short side of the top of the margin of the opening in the center console. The cover is usually cushioned and covered with leather or leatherette, to match the interior, or parts of the interior, of the automobile. Nevertheless, for cost considerations, or for other reasons, the usual height of the top of the center console (the position of the cover thereof) is such that, in terms of its use as an armrest, it is inconveniently low, as to the height position thereof.

It is therefore the primary function of the present invention to adjust the height of the center console, by extending it upwardly, as an after-market availability to the automobile driving public, without reconstructing the factory automobile appointments, at a reasonable cost, and in order to provide a comfortable height of right armrest for the driver.

It appears from the data available to the applicant herein, that the average height of the top of center consoles, as described herein, requires an upward extension of one and a half inches to five inches, in order to provide a comfortable height for use as an armrest.

Considering all of the foregoing, preferred and alternative embodiments of the present invention are now described, with reference to the drawings.

Figure 1:
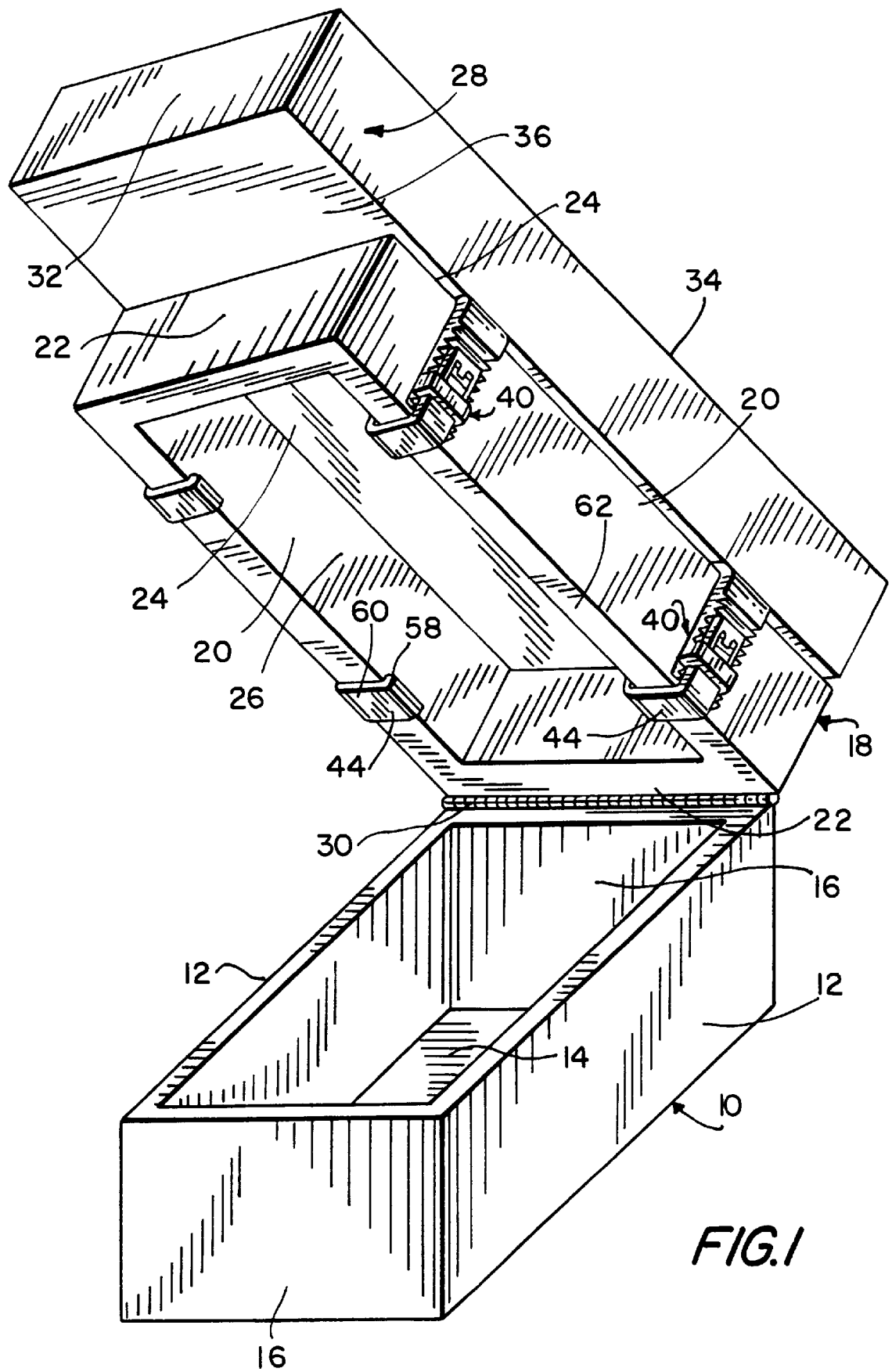
FIG. 1 is an isometric view of an extending cushion pursuant to the present invention, with its securement means extending from the bottom thereof, and showing the center console with a typical center console cover, hinged to the center console and shown in the open position to better illustrate a securement means according to the preferred embodiment.

Referring to FIG. 1, the center console is generally labelled 10, with long side walls 12, a bottom 14, short side walls 16 and a cover, generally designated 18. The cover comprises, typically, long side walls 20, short side walls 22, and a top 24, all defining cover opening 26, which is usually the factory attempt to upwardly extend the overall height of the center console, so that it can be used as an armrest. Nevertheless, in most cases, if not all cases, the center console does not achieve a height or a length to allow it to function as a comfortable right armrest for the driver.

According to the present invention, armrest extension cushion, generally designated 28 is provided, in order to upwardly extend the height of the center console, and yet to allow convenient opening of the console 10, by lifting cover 18, by means of hinge attachment 30, commonly at the top of one of the short side walls 16.

Armrest extension 28 is generally in the shape of a solid rectangle, defining front portion 32 for adding comfort when the armrest extension is functioning to provide comfort to the driver. Appropriately, armrest extension 28 is covered by a leatherette or leather covering 34, in various colors, or in a neutral color in order to fit in aesthetically with the interior decoration of the automobile. In more detail, the armrest extension cushion 28 is filled with high-density foam (not shown) and includes a flexible, plastic or other material base. Bottom wall 36 of armrest extension 28 defines opening means 38 (FIG. 2) for accommodating the fixing of adjustable clip construction generally designated 40, in the preferred embodiment, which construction is shown best in FIG. 3 hereof. Adjustable clip construction 40 includes two L-shaped portions, brace portion 42 and adjustable clip portion 44.

Brace portion 42, has a brace portion short leg 46, defining an opening 48 for affixing the adjustable clip construction to the bottom 36 of cushion 28, by use of opening means 38. Brace portion long leg 50, defines at its outer surface ratchet means 52 for enabling the coupling to adjustable clip portion 44 in a movable manner. Adjustable clip portion 44 is formed of tensioned metal or plastic, whereby its selected position, with respect to ratchet means 52, becomes fixed and secure upon placement. Tongue and opening means 54 defined thereby at the upper end of long leg 56 of the L-shaped adjustable clip portion 44, enables the springy coupling and, in combination with the material of clip portion 44, enables a press near the intersection of the legs of clip portion 44 (at the lower part of long leg 56) to release and move adjustable clip portion 44.

As to the coupling between adjustable clip construction 40 and the cover 18 of center console 10, the end 58 of the short leg 60 of adjustable clip portion 44 curls around and under the marginal portion 62 of the underside of cover 18 of center console 10, as shown particularly in FIG. 1.

In order to provide a more complete description of the preferred embodiment, a series of steps will now be provided for mounting, moving and removing armrest extension 28 from the center console 10. Armrest extension cushion 28 is placed upon cover 18 of center console 10, while such cover is in its closed position (FIG. 2). Since it is assumed that brace portion 42 is already attached to the underside of armrest extension 28, the adjustable clip portion 44 is placed within the opening defined by ring 64 (FIG. 3), with tongue and opening means 54 locked within ratchet means 52, by pulling thereon, after end 58 of short leg 60 has been curled around the margin of cover 18. Removal or moving of adjustable clip construction 40 is accomplished by manually pressing the lower part of long leg 56 of adjustable clip portion 44, which releases tongue and opening means 54, to allow adjustable clip construction 40 to be removed or moved.

Figure 4:
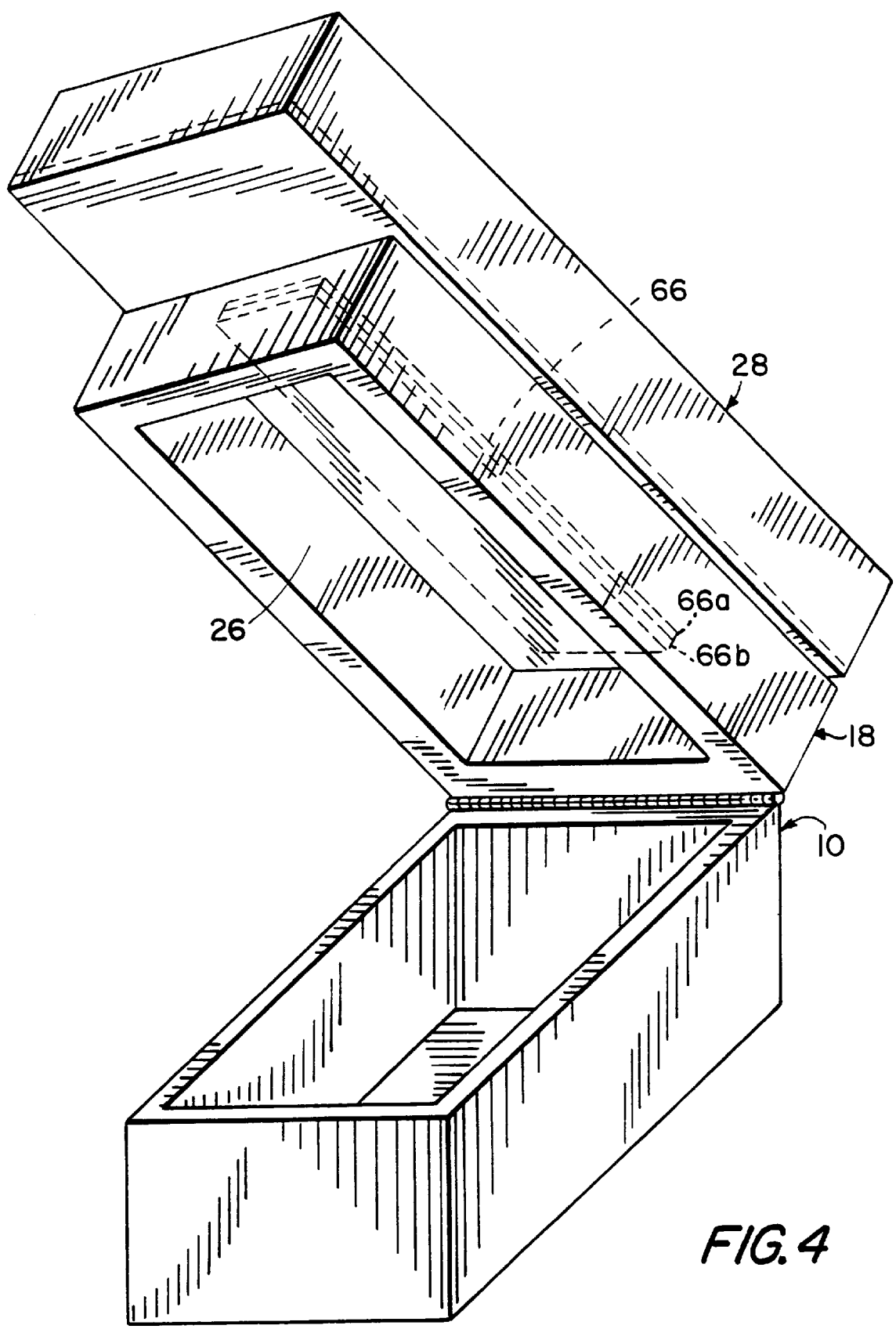
FIG. 4 is an isometric view of an extending cushion, according to the present invention, attached to the cover of an open center console by an alternative embodiment of means for fixing the cushion to the cover.

An alternative embodiment for attachment of armrest extension cushion 28 to cover 18 of center console 10, is shown in FIGS. 4, 5 and 6. Specifically, mating strips 66 form a Velcro or other type of fastener, whereby the basic material of strips 66 is flexible plastic or fabric and one part 66a of strips 66 (see break-away portion of FIG. 5) defines projecting hooks or the like, and the other part 66b of strips 66 defines projecting loops or the like. In more detail, the blow-up, sectional, schematic view, shown in FIG. 6, illustrates that when armrest extension cushion 28 is placed upon the top surface of cover 18, and moved laterally somewhat, the loops encircle and hold the hooks, thereby to affix armrest extension 28 to the center console.

While the foregoing description is intended to describe adequately the details of the preferred embodiment, and an alternative embodiment, the limits of the present invention are only defined by the following claims:

What is claimed is:

1. An armrest extension for an automobile center console with a cover, comprising an armrest extension cushion generally in the shape of a solid rectangle, said cushion defining sides, a top surface and a bottom surface, and means affixed to and depending from said bottom surface for removably attaching said cushion to and extending upwardly from said cover, said means including an adjustable clip construction affixed to and depending from said bottom surface, said adjustable clip construction including two L-shaped portions and ratchet means, a brace portion for attachment to said bottom surface and an adjustable clip portion, coupled by said ratchet means to said brace portion and thereby slidably adjustable with respect thereto, and means for removably attaching said adjustable clip portion relative to said center console cover.

* * * * *